(12) United States Patent
Wan et al.

(10) Patent No.: US 9,747,544 B2
(45) Date of Patent: Aug. 29, 2017

(54) METHOD AND SYSTEM FOR WASTEWATER TREATMENT BASED ON DISSOLVED OXYGEN CONTROL BY FUZZY NEURAL NETWORK

(75) Inventors: Jinquan Wan, Guangzhou (CN); Mingzhi Huang, Guangzhou (CN); Yongwen Ma, Guangzhou (CN); Yan Wang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 989 days.

(21) Appl. No.: 13/985,482

(22) PCT Filed: Sep. 22, 2011

(86) PCT No.: PCT/CN2011/079993
§ 371 (c)(1),
(2), (4) Date: Oct. 25, 2013

(87) PCT Pub. No.: WO2012/109900
PCT Pub. Date: Aug. 23, 2012

(65) Prior Publication Data
US 2014/0052422 A1 Feb. 20, 2014

(30) Foreign Application Priority Data
Feb. 14, 2011 (CN) .......................... 2011 1 0037484

(51) Int. Cl.
*G06N 3/04* (2006.01)
*C02F 3/00* (2006.01)
(Continued)

(52) U.S. Cl.
CPC .......... *G06N 3/0436* (2013.01); *C02F 3/006* (2013.01); *C02F 3/30* (2013.01); *G05B 13/048* (2013.01);
(Continued)

(58) Field of Classification Search
CPC combination set(s) only.
See application file for complete search history.

(56) References Cited

U.S. PATENT DOCUMENTS 5,589,068 A * 12/1996 Nielsen .................... C02F 3/006
210/614
6,845,336 B2 * 1/2005 Kodukula ............... C02F 1/008
700/48

(Continued)

FOREIGN PATENT DOCUMENTS

CN 1778714 A 5/2006
CN 1872731 A 12/2006
(Continued)

OTHER PUBLICATIONS

Li, B., and P. Bishop. "Oxidation-reduction potential (ORP) regulation of nutrient removal in activated sludge wastewater treatment plants." Water Science and Technology 46, No. 1-2 (2002): 35-39.*
(Continued)

*Primary Examiner* — Aniss Chad
(74) *Attorney, Agent, or Firm* — JMB Davis Ben-David (57) ABSTRACT

A method and system for wastewater treatment based on dissolved oxygen control by a fuzzy neural network, the method for wastewater treatment comprising the following steps: (1) measuring art inlet water flow rate, an ORP value in an anaerobic tank, a DO value in an aerobic tank, an inlet water COD value, and an actual outlet water COD value; (2) collecting the measured sample data and sending them via a computer to a COD fuzzy neural network predictive model, so as to establish an outlet water COD predicted value, (3) comparing the outlet water COD predicted value with the outlet water COD set value, so as to obtain an error and an error change rate, and using them as two input variables to adjust a suitable dissolved oxygen concentration. Accordingly, the on-line prediction and real-time control of dissolved oxygen (Continued)

wastewater treatment are achieved. The accurate control of dissolved oxygen concentration by the present method for wastewater treatment can achieve a saving in energy consumption while ensuring stable running of the sewage treatment system, and the outlet water quality meets the national emission standards.

10 Claims, 4 Drawing Sheets

(51) Int. Cl.
  *C02F 3/30* (2006.01)
  *G05B 13/04* (2006.01)
(52) U.S. Cl.
  CPC .. *C02F 2209/001* (2013.01); *C02F 2209/003* (2013.01); *C02F 2209/005* (2013.01); *C02F 2209/04* (2013.01); *C02F 2209/08* (2013.01); *C02F 2209/22* (2013.01); *C02F 2209/40* (2013.01); *Y02W 10/15* (2015.05)

(56) References Cited

U.S. PATENT DOCUMENTS

| | | | |
|---|---|---|---|
| 7,285,223 B2* | 10/2007 | Martin | C02F 1/008 210/143 |
| 2006/0042461 A1 | 3/2006 | Boyden et al. | |
| 2007/0090059 A1* | 4/2007 | Plummer | C02F 1/008 210/743 |
| 2010/0163469 A1* | 7/2010 | Wan | G05D 21/02 210/96.1 |
| 2013/0233796 A1* | 9/2013 | Rao | B01D 61/00 210/639 |

FOREIGN PATENT DOCUMENTS

| CN | 201191473 Y | 2/2009 |
|---|---|---|
| CN | 101923083 | 12/2010 |

OTHER PUBLICATIONS

Du, Y. G., R. D. Tyagi, and R. Bhamidimarri. "Use of fuzzy neural-net model for rule generation of activated sludge process." Process Biochemistry 35, No. 1 (1999): 77-83.*

Civelekoglu, G., N. O. Yigit, E. Diamadopoulos, and M. Kitis. "Modelling of COD removal in a biological wastewater treatment plant using adaptive neuro-fuzzy inference system and artificial neural network." Water Science and Technology 60, No. 6 (2009): 1475-1487.*

Li, Baikun, and Paul L. Bishop. "The application of ORP in activated sludge wastewater treatment processes." Environmental engineering science 18, No. 5 (2001): 309-321.*

International Search Report and Written Opinion; PCT/CN2011/079993; Dec. 8, 2011.

* cited by examiner

METHOD AND SYSTEM FOR WASTEWATER TREATMENT BASED ON DISSOLVED OXYGEN CONTROL BY FUZZY NEURAL NETWORK

This application relies on, and claims the benefit of the filing date of, Chinese patent application number CN 201110037484.3, filed 14 Feb. 2011, the entire disclosure of which is hereby incorporated herein by reference.

FIELD OF THE INVENTION

The present invention relates to a control method and system for wastewater treatment. In particular the invention relates to an artificial intelligence control method and system of controlling dissolved oxygen based on influent loading, operation of the reactor and the processing target of water quality.

BACKGROUND OF THE INVENTION

In the particular case of aerobic biological treatment technology, the instrumentation, the control and the automation are key factors when the process must be operated to achieve restricted discharge levels. Nowadays, the dissolved oxygen (DO) is one of the most important parameter to control because of its impact on the biological processes and the energy saving related to aeration. The dissolved oxygen concentration in the aerobic biological treatment process should be sufficiently high to supply enough oxygen to the microorganisms in the sludge, so organic matter can be degraded efficiently. On the other hand, an excessively high DO, which requires a high airflow rate, leads to a high energy consumption and may also deteriorate the sludge quality. Hence, both for economical and process reasons, it is of interest to control the DO.

However, the efficient operation of aerobic treatment process is limited and difficult because it is affected by a variety of physical, chemical, and biological factors. The classical methods (on/off and PID) have largely been used but, due to the non-linear character of the bioprocesses and the lack of available models, the controllers were developed for specific operating and environmental conditions. The most significant advantage of intelligence control is that no precise mathematical model is needed, which can well approach any nonlinear continuous function and overcome the shortcomings of traditional control that over depend on accurate mathematical model. In the present invention an integrated neural-fuzzy process controller is developed to predict and control the aeration performance of an aerobic wastewater treatment Process. With such a hybrid fuzzy control algorithm, the proposed controller may lead to determine the optimal airflow rate over operational time period that could end up saving energy.

SUMMARY OF THE INVENTION

In order to overcome the limitations of traditional technology, the present invention provides an integrated fuzzy neural network process controller which combines fuzzy Logic control (FLC) with artificial neural network (ANN) and can realize fuzzy logic by neural network. Meanwhile, the controller can get hold of fuzzy rules and optimize its subjection function online by self-learning ability of the neural network. So, the designed DO fuzzy neural network control model with five layers based on the characters of the influent quality and operation of the reactor is used for controlling dissolved oxygen in the wastewater treatment, it can acquire better effect.

The aim of the present invention can be realized by the following technology program:

The invention provides a method of wastewater treatment based on dissolved oxygen control by fuzzy neural network, comprising the following steps:

(1) Measuring an inflow flowrate, an ORP value in an anaerobic tank corresponding to the real-time aeration quantity, a DO value in an aerobic tank corresponding to the real-time aeration quantity, an influent COD value, and an actual effluent COD value in the A/O wastewater treatment process;

(2) Collecting the measured sampling data, sending them via a computer to a COD fuzzy neural network predictive model, and computing as physical quantities, so as to establish an effluent COD predicted value;

(3) Comparing the effluent water COD predicted value with the effluent COD set value, an error and an error change rate of the effluent COD value are obtained. And the error and the error change rate of the effluent COD value are used as two input variables of the DO fuzzy neural network control model, so a correction amount of aeration quantity and correct the real-time aeration quantity is obtained. Then air blower is controlled to realize adjusting a suitable dissolved oxygen concentration by the control system according to the corrected real-time aeration quantity. In addition, the corrected aeration quantity is also used as an input of the COD fuzzy neural predictive model, and the predicted COD value of the next period is obtain by the predictive model according the corrected aeration quantity.

(4) Repeating the same step into the next cycle. Accordingly, the on-line prediction and real-time control of dissolved oxygen in the wastewater treatment process are achieved.

The described COD fuzzy neural network predictive model includes the input layer, the hidden layer and the output layer, and the hidden layer is divided into three layers: fuzzification input layer, rules layer and fuzzification output layer. It can realize fuzzification, fuzzy inference and defuzzification according the five layer network. In the invention, the parameters of the network and the architecture of the model are identified by fuzzy C-means clustering and the error back-propagation algorithm. Moreover fuzzy rule layer is identified by two-way flow of network data and competitive learning of the middle layer, and some rules are got by the experts' experience, which are carried out by the signal transmission. Based on Windows CE.NET embedded operating system, combining the theory of configuration software and the configuration programming techniques, fuzzy neural network algorithm with MCGS (Monitor and Control Generated System) development package using VB program is developed, and then it is embedded into MCGS according to MCGS interface function criterion to achieve intelligent control system for wastewater treatment, so the dissolved oxygen control model according to the different situation is achieved.

The architecture of the described COD fuzzy neural network predictive model with five layers is described below:

Layer 1 is the described input layer: it has five nodes in the input layer, and five input variables are the inflow flowrate, the influent COD, the ORP value in an anaerobic tank, the aeration quantity, the DO value in an aerobic tank, and the actual effluent COD value;

Layer 2 is the described fuzzification input layer: the second layer calculates the membership corresponding to each input variable (nodes: 5×11);

Layer 3 is the described rules layer with 11 nodes: the premise calculation of the rules which are used as a simple multiplier is realized;

Layer 4 is the described fuzzification onput layer with 11 nodes: the fourth layer calculates the fitness value of a fuzzy rule;

Layer 5 is the described output layer with 1 node: the output node is the effluent COD predicted value.

The described DO fuzzy neural network control model includes one input layer, three hidden layers and one output layer, and the three hidden layers are the fuzzification input layer, the rules layer and the fuzzification output layer, respectively. It can realize fuzzification, fuzzy inference and defuzzification according the network with five layers. Moreover grid partition is proposed to classify the input data and make the rules in modeling the DO control system.

The architecture of the described DO fuzzy neural network control model with five layers is described below:

Layer 1 is the described input layer: it has two nodes in the input layer, and the input variables are the error and an error change rate of the effluent COD value;

Layer 2 is the described fuzzification input layer: the second layer calculates the membership corresponding to each input variable; the input variables are subdivided into seven reference fuzzy sets and the nodes is 14;

Layer 3 is the described rules layer with 49 nodes: there are 2 input vectors and for each input vector seven MFs are needed, so the number of rules is 49;

Layer 4 is the described fuzzification output layer with 49 nodes: the fourth layer calculates the fitness value of a fuzzy rule;

Layer 5 is the described output layer with 1 node: the output node is the correction amount of aeration quantity.

The characteristics of the wastewater treatment process are described as follow: the influent COD value is 600~2000 mg/l, the ORP value in an anaerobic tank is −200~0 mv, and the DO value in an aerobic tank is 0.2~4.5 mg/l.

The described DO fuzzy neural network control model is realized for controlling the dissolved oxygen according to the following theory:

With the influent loading increasing, the air supply is increased, and the air supply is decreased with the influent loading decreasing.

The method of the invention also comprises the following steps: base on TCP/IP and serial data interface (R232/485), real-time control of the system is achieved according to the computer and two-way communication tool; after the control operation, the system can make a comparative analysis for process efficiency of the wastewater treatment process using PC, and save it.

The wastewater treatment control system in the present invention includes an A/O wastewater treatment process, a COD fuzzy neural network predictive model and a DO fuzzy neural network control model. The inflow flowrate, the influent COD value, the ORP value in an anaerobic tank, the DO value in an aerobic tank, and the actual effluent COD value are detected by the sensors. And the detection signals are sent to the COD fuzzy neural network predictive model through A/D convert module of ADAM4017+ and ADAM4520 (Advantech, Chinese Taipei), so that the effluent COD predicted value is obtained. Meanwhile the digital signals are changed into analog signals by ADAM4024 (Advantech, Chinese Taipei) to control the speed of water pump and air blower.

Comparing the existing technology, the present invention has the following advantages and beneficial effects:

(1) The present invention is the combination of fuzzy logic and neural networks, and can realize fuzzy logic by neural network. Meanwhile, the developed control system can get hold of fuzzy rules and optimize its subjection function online by self-learning ability of the neural network.

(2) The developed control system ensures security and stabilization on the wastewater treatment process, effectively achieves the required real-time control dissolved oxygen and may become an efficient and cost-effective tool to deal with the unexpected uncertainties in the wastewater treatment process.

(3) With the present method for wastewater treatment, the effluent quality could meet the national discharged standards being satisfied, another system objective will then be the minimization of the treatment cost.

DETAILED DESCRIPTION OF EXEMPLARY EMBODIMENTS

It will be apparent to those skilled in the art, that is, to those who have knowledge or experience in this area of technology, so that many uses and design variations are possible for the improved wastewater treatment methods and devices disclosed herein. The following detailed discussion of various alternative and preferred embodiments will illustrate the general principles of the invention with reference to illustrative examples and preferred embodiments. Therefore, the technical scope of the present invention encompasses not only the embodiments described bellow, but also all that fall within the scope of the appended claims.

Exemplary Embodiment 1

Figure 1:
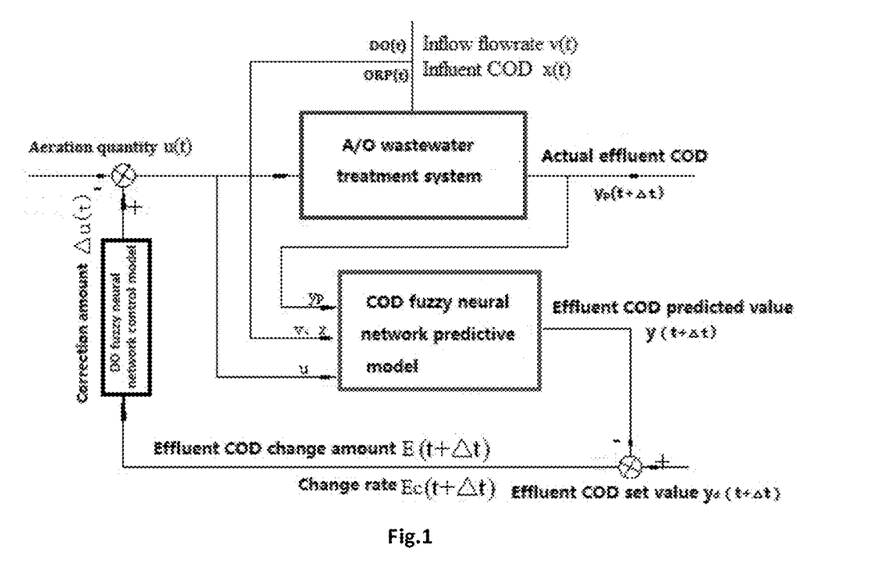
FIG. 1. Diagram of fuzzy neural network predictive control method for wastewater treatment.

As shown FIG. 1, a method for wastewater treatment based on dissolved oxygen control by a fuzzy neural network, the method for wastewater treatment comprising the following steps:

(1) Measuring an inflow flowrate, an ORP value in an anaerobic tank corresponding to the real-time aeration quantity, a DO value in an aerobic tank corresponding to the real-time aeration quantity, an influent COD value, and an actual effluent COD value in the A/O wastewater treatment process;

(2) Collecting the measured sampling data, sending them via a computer to a COD fuzzy neural network predictive model, and computing as physical quantities, so as to establish an effluent COD predicted value;

(3) Comparing the effluent water COD predicted value with the effluent COD set value, an error and an error change rate of the effluent COD value are obtained. And the error and the error change rate of the effluent COD value are used as two input variables of the DO fuzzy neural network control model, so a correction amount of aeration quantity and correct the real-time aeration quantity is obtained. Then air blower is controlled to realize adjusting a suitable dissolved oxygen concentration by the control system according to the corrected real-time aeration quantity. In addition, the corrected aeration quantity is used as an input of the COD fuzzy neural predictive model, and the predicted COD value of the next period is obtain by the predictive model according the corrected aeration quantity.

(4) Repeating the same step into the next cycle. Accordingly, the on-line prediction and real-time control of dissolved oxygen in the wastewater treatment process are achieved.

Figure 2:
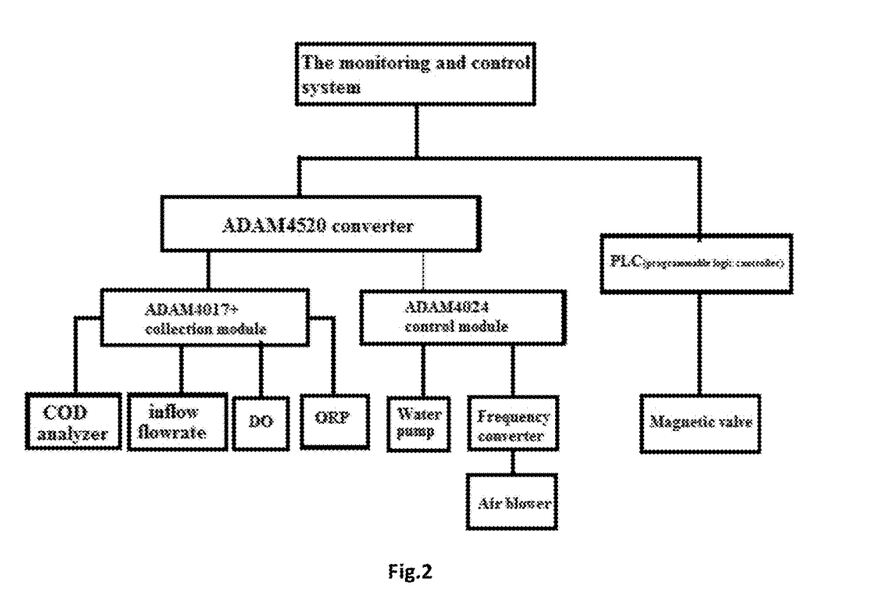
FIG. 2. Electric hardware diagram of wastewater treatment process control system.

As illustrated in FIG. 2, dissolved oxygen control of a wastewater treatment system based on fuzzy neural network in the present invention includes an A/O wastewater treatment process, a COD fuzzy neural network predictive model and a DO fuzzy neural network control model. And the described COD fuzzy neural network predictive model and DO fuzzy neural network control model are embedded in the monitoring and control system. As shown in FIG. 2, the monitoring and control system is based on probes from HACH®, cards from Advantech®, and interfaces (MCGS, Monitor and Control Generated System) from Kunluntongtai®. MCGS, which has the characteristic of high real-time, visual operating interface, powerful function and convenience operating, supports ADAM driver module, and can read/write the signal of ADAM. The inflow flowrate, the influent COD value, the ORP value in an anaerobic tank, the DO value in an aerobic tank, and the actual effluent COD value are detected by the sensors. And the detection signals are sent to COD fuzzy neural network predictive model through A/D convert module of ADAM4017+ and ADAM4520 (Advantech, Chinese Taipei), so that the effluent COD predicted value is obtained; the digital signals are changed into analog signals by ADAM4024 (Advantech, Chinese Taipei) to control the speed of water pump and air blower. Firstly, according to the influent loading, operation of the reactor and the processed effluent quality, the COD fuzzy neural network predictive model predicts the effluent COD at time (t+$\Delta$t); then comparing the predicted value of COD with the setpoint at time (t+$\Delta$t), error and an error change rate of the effluent COD value at time (t+$\Delta$t) (E and Ec) are obtained, and using them as two input variables of the DO fuzzy neural network control model, a correction amount of aeration quantity is obtained by the control model, so as to realize adjusting the aeration quantity automatically. In addition, the corrected aeration quantity is used as an input of the COD fuzzy neural predictive model, and the predicted COD value of the next period is obtain by the predictive model according the corrected aeration quantity. However there are errors between the predicted COD value and the setpoit, so error and an error change rate of the effluent COD value is used as two input variables of the DO fuzzy neural network control model, and the corrected aeration quantity of the next period is obtained. Repeat the same step into the next cycle. Accordingly, the on-line prediction and real-time control of dissolved oxygen in the wastewater treatment process are achieved.

Figure 3:
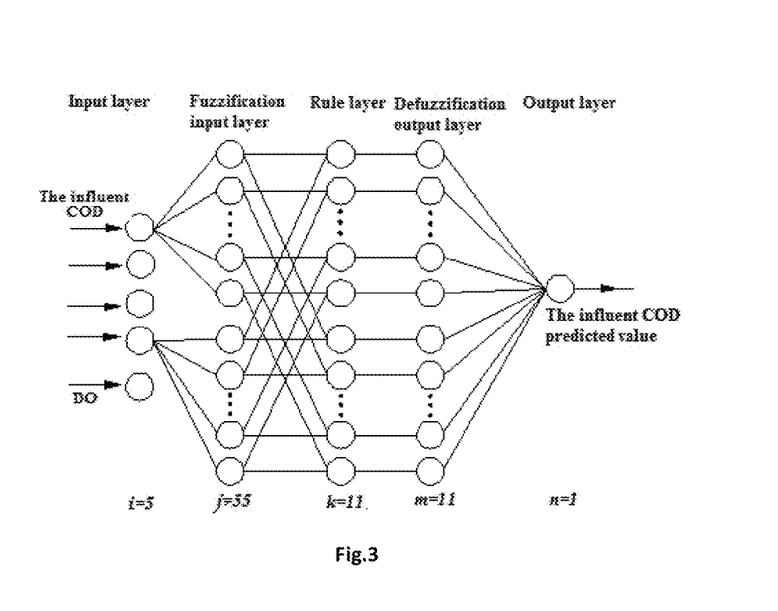
FIG. 3. The structure of the COD fuzzy neural network predictive model.

FIG. 3 is the structure of the COD fuzzy neural network predictive model in the present invention. Layer 1 is the described input layer: it has five nodes in the input layer, and five input variables are the inflow flow rate, the influent COD value, the ORP value in an anaerobic tank, the aeration quantity, the DO value in an aerobic tank, and the actual effluent COD value. Layer 2 is the described fuzzification input layer: the second layer calculates the membership corresponding to each input variable (nodes: 5×11). Layer 3 is the described rules layer with 11 nodes: the premise calculation of the rules which are used as a simple multiplier is realized. Layer 4 is the described fuzzification output layer with 11 nodes: the fourth layer calculates the fitness value of a fuzzy rule. Layer 5 is the described output layer with 1 node: the output node is the effluent COD predicted value. From FIG. 3, it can be seen that the training data are analyzed by fuzzy C-means clustering function, and are divided into 11 clusters. Thus each cluster represents a rule. Moreover the network consists of three hidden layers: fuzzification input layer, rules layer and fuzzification output layer, which can express if-then rules. It can realize fuzzification, fuzzy inference and defuzzification according the network with five layers.

Figure 4:
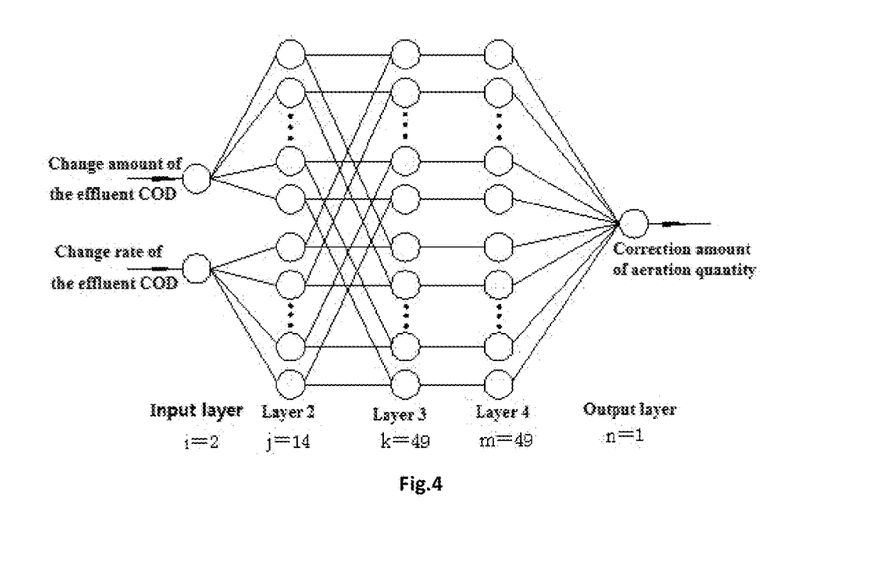
FIG. 4. The structure of the DO fuzzy neural network control model.

The described DO fuzzy neural network control model is realized for controlling the dissolved oxygen according to the following theory: with the influent loading increasing, the air supply is increased, and the air supply is decreased with the influent loading decreasing. FIG. 4. is the structure of the DO fuzzy neural network control model in the present invention. Layer 1 is the described input layer: it has two nodes in the input layer, and the input variables are the error and an error change rate of the effluent COD value. Layer 2 is the described fuzzification input layer: the second layer calculates the membership corresponding to each input variable; the input variables are subdivided into seven reference fuzzy sets and the nodes is 14. Layer 3 is the described rules layer with 49 nodes: there are 2 input vectors and for each input vector seven MFs are needed, so the number of rules is 49. Layer 4 is the described fuzzification output layer with 49 nodes: the fourth layer calculates the fitness value of a fuzzy rule. Layer 5 is the described output layer with 1 node: the output node is the correction amount of aeration quantity.

The method of the invention also comprises the following steps: base on TCP/IP and serial data interface (R232/485), real-time control of the system is achieved according to the computer and two-way communication tool; after the control operation, the system can make a comparative analysis for process efficiency of the wastewater treatment process using PC, and save it.

According to the operation condition of the wastewater treatment process. The developed fuzzy neural network models in the present invention are used for the feedforward control and feedback control of dissolved oxygen in the wastewater treatment process, and the base value of control frequency of frequency converter is set as 20 Hz. The measured sampling data (the inflow flowrate, the ORP value in an anaerobic tank, the DO value in an aerobic tank, the aeration quantity and the effluent COD value is collected, send to a COD fuzzy neural network predictive model via a computer, and computed as physical quantities, so an effluent COD predicted value is established. Where the sample time $\Delta$t is set as 2 min. The correction amount of aeration quantity is obtained by the control system, and the control frequency of frequency converter is adjusted by the control signal from the computer, so that the real-time control of the aeration quantity can be realized. The relationship of the real-time control is shown in table 1.

Figure 5:
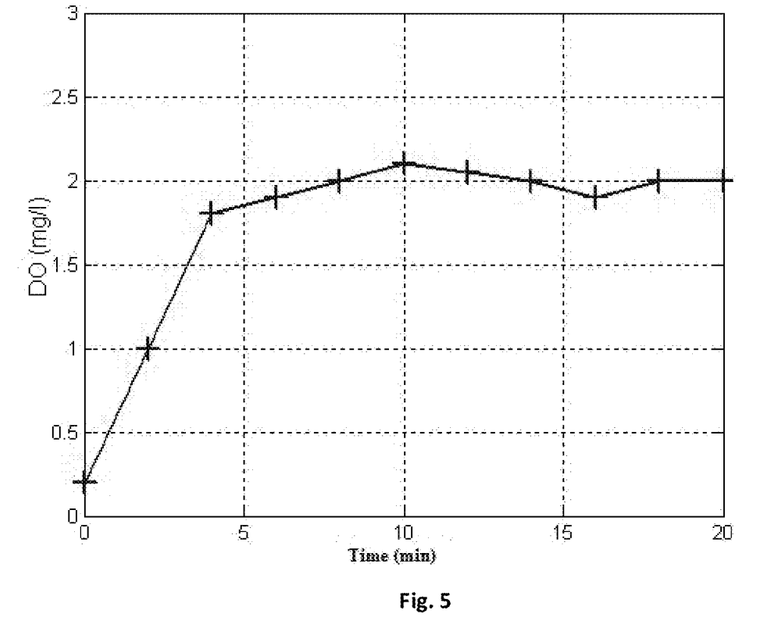
FIG. 5. Change curves of DO concentration.
Figure 6:
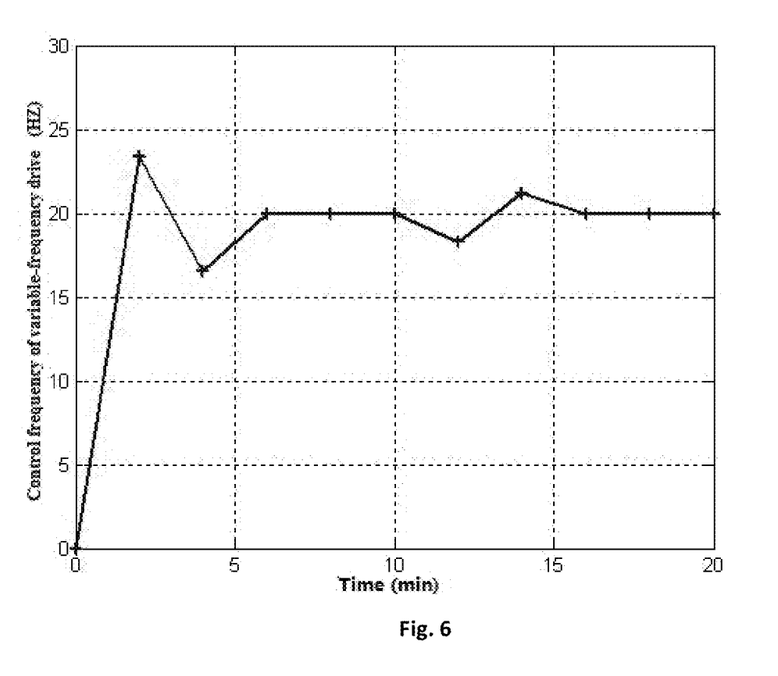
FIG. 6. Change curves of the frequency converter for controlling the air blower.

In addition, according to the relationship of the real-time control shown in table 1, the change curves of DO concentration and the frequency converter for controlling the air blower shown in FIGS. 5 and 6 are obtained. From FIGS. 5 and 6, it can be seen that, based on a series of computer operation runs, the control performance of the DO control system was obtained in terms of the influent loading, environmental and economic objectives simultaneously. Such an advanced hybrid intelligent control system may provide immediate guidance and precise control for DO with respect to multi-objective requirements using on-line process data. It is believed that the control architecture that has been developed in the present invention may even function well within limited of time for various types of physical, chemical, and biological waste treatment systems when coping with on-line upset conditions.

TABLE 1

Change of DO concentration under control system

| DO concentration (mg/l) | 0.49 | 1.38 | 1.79 | 1.87 | 2 | 2.02 | 2.25 | 1.96 | 2 | 2 |
|---|---|---|---|---|---|---|---|---|---|---|
| DO deviation (mg/l) | −1.51 | −0.62 | −0.21 | −0.13 | 0 | 0.02 | 0.25 | −0.04 | 0 | 0 |
| Chang of DO deviation (mg/l) | −1.60 | −0.49 | 0.81 | 0.49 | 0.1 | 0.49 | 0.47 | −0.15 | 0.1 | 0 |
| E | −5.29 | −2.17 | −0.75 | −0.47 | 0 | 0.07 | 0.9 | −0.15 | 0 | 0 |
| EC | −4.80 | −1.49 | −2.44 | 1.41 | 0.35 | 1.49 | 1.41 | −0.47 | 0 | 0 |
| Output amount U | 4.9 | −2.8 | 1.4 | 0.7 | 0 | −0.2 | −1.1 | 0.35 | 0 | 0 |
| Control frequency(HZ) | 27 | 24 | 22 | 21 | 20 | 19.8 | 18.5 | 2.05 | 20 | 20 |

Figure 7:
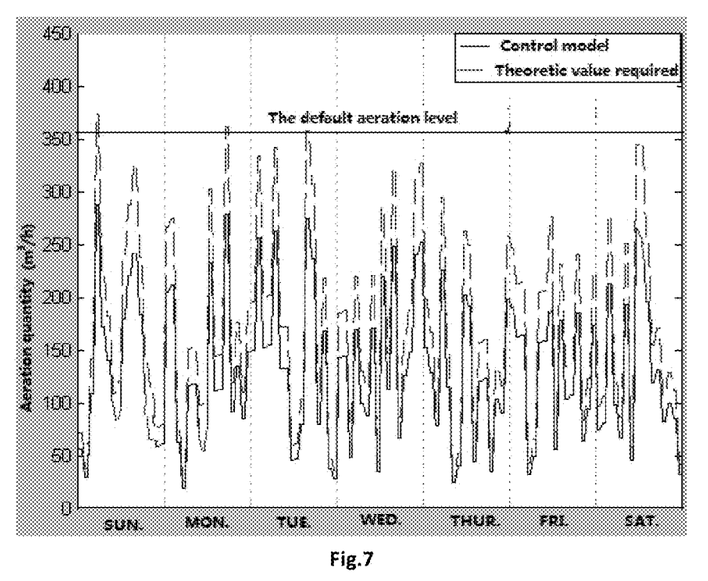
FIG. 7. A comparisons of the default aeration level, the theoretical air supply required, and the controlled aeration quantity according to the developed control system.

FIG. 7 shows the comparisons of the default aeration level, the theoretical air supply required, and the controlled aeration quantity according to the control system developed in the present invention. In regards to aeration, it shows that the air supply based on the fuzzy neural network control system has a consistent trend with the dynamic variation of air required theoretically in the biological wastewater treatment process. Yet the aeration via the fuzzy neural network control system exhibits a relatively cheaper and steady way. In terms of the cost effectiveness, it enables us to save almost 33% of the operation cost during the time period when DO control system can be applied. A comparison between operation with and without the fuzzy neural network control system can be made as well. In order to confirm the reliability of such a hybrid intelligent control system, a comparative analysis program shown as table 2 was carried out between 2006 and 2007. From table 2, it can be seen that, with the control system, it eventually leads to a satisfactory situation in compliance with the official effluent standard from the point of view. Also, not only the stability but also the compliance with the effluent quality standards can be fully confirmed. Cost effective operation by injecting less amount of air would be the major contribution. The fuzzy neural network controller designed in this analysis brings the spirit of human thinking and reasoning into a neural network structure, which help derive the representative state function for use in simulating system behavior. Such an advanced hybrid control approach effectively achieves the required real-time control objectives and may become an efficient and cost-effective tool to deal with the unexpected uncertainties in the wastewater process.

Table 2 Comparing the effluent quality of the A/O system between operation with and without the DO control system

TABLE 2

| Date | COD | SS | NH$_4^+$ | pH | BOD |
|---|---|---|---|---|---|
| The effluent quality of the A/O system operated without the DO control system | | | | | |
| 15 Feb. 2006 | 42.6 | 13 | 16 | 7.5 | 27 |
| 20 Apr. 2006 | 58.9 | 6 | 4 | 6.8 | 7 |
| 3 Jun. 2006 | 34.3 | 12 | 7 | 7.4 | 21 |
| 10 Aug. 2006 | 41.2 | 8 | 12 | 7.3 | 17 |
| 2 Nov. 2006 | 29.7 | 3 | 6 | 6.9 | 9 |
| The effluent quality of the A/O system operated with the DO control system | | | | | |
| 18 Feb. 2007 | 39.1 | 20 | 13 | 7.1 | 16 |
| 22 Apr. 2007 | 54.8 | 7 | 9 | 7.2 | 12.5 |
| 7 Jun. 2007 | 49.2 | 6 | 11 | 7.4 | 19.8 |
| 13 Aug. 2007 | 57.5 | 9 | 6 | 7.2 | 23.7 |
| 4 Nov. 2007 | 42.6 | 12 | 10 | 6.9 | 18.4 |

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with modifications are suited to the particular use contemplated. All such modifications and variations are within the scope of the present invention as determined by the appended claims when interpreted in accordance with the benefit to which they are fairly, legally, and equitably entitled.

What is claimed is:

1. A method of wastewater treatment based on control of dissolved oxygen using a fuzzy neural network, the method comprising:
    measuring an inflow flowrate, an oxidation-reduction potential (ORP) value in an anaerobic tank corresponding to real-time aeration quantity, a dissolved oxygen (DO) value in an aerobic tank corresponding to real-time aeration quantity, an influent chemical oxygen demand (COD) value, and an actual effluent COD value in an anaerobic/oxic (A/O) wastewater treatment process;
    collecting the measured data, sending the data via a computer to a COD fuzzy neural network predictive model, and computing as physical quantities, so as to establish an effluent COD predicted value;
    obtaining an error and an error change rate of the effluent COD value;
    comparing the effluent COD predicted value with an effluent COD set value;
    determining an effluent COD error or change amount and an effluent COD error change rate;
    inputting the effluent COD error or change amount and the effluent COD error change rate as two input variables to a DO fuzzy neural network control model, and using the DO fuzzy neural network control model to determine a correction amount of aeration quantity, thus obtaining a corrected real-time aeration quantity;
    controlling an air blower to obtain a suitable dissolved oxygen concentration by a control system according to the corrected real-time aeration quantity;
    inputting the corrected aeration quantity as an input of the COD fuzzy neural network model;
    obtaining a second effluent COD predicted value using the COD fuzzy neural network predictive model using the corrected aeration quantity; and
    repeating the same steps recited above in subsequent cycles, thus providing a method of wastewater treatment based on control of dissolved oxygen using a fuzzy neural network using an on-line prediction and real-time control of dissolved oxygen in the wastewater treatment method.

2. The method according to claim 1, wherein the COD fuzzy neural network predictive model includes an input layer, a hidden layer, and an output layer, wherein the hidden layer is further divided into three layers: a fuzzification input layer, a rules layer, and a fuzzification output layer that comprises fuzzification, fuzzy inference, and defuzzification.

3. The method according to claim 1, wherein the architecture of the COD fuzzy neural network predictive model comprises the following five layers:
Layer 1 is an input layer, which has five nodes for five input variables: an inflow flow rate, an influent COD value, an ORP value in the anaerobic tank, an aeration quantity, a DO value in the aerobic tank, and the actual effluent COD value;
Layer 2 is a fuzzification input layer, wherein the second layer calculates membership corresponding to each input variable (nodes: 5×11);
Layer 3 is a rules layer with 11 nodes that provide rules that are used to achieve a simple multiplier;
Layer 4 is a fuzzification output layer with 11 nodes, wherein the fourth layer calculates a fitness value of a fuzzy rule; and
Layer 5 is an output layer with 1 node, wherein the output node is the effluent COD predicted value.

4. The method according to claim 1, wherein the DO fuzzy neural network control model includes five layers: an input layer, a hidden layer, and an output layer, wherein the hidden layer is further divided into three layers: a fuzzification input layer, a rules layer, and a fuzzification output layer that can comprises fuzzification, fuzzy inference, and defuzzification, and wherein a grid partition is used within the rules layer to classify input data and make rules.

5. The method according to claim 4, wherein the architecture of the DO fuzzy neural network control model comprises five layers:
Layer 1 is the input layer, wherein there are two nodes in the input layer and input variables for the input layer are the effluent COD error or change amount and the effluent COD error change rate;
Layer 2 is the fuzzification input layer, wherein the second layer calculates membership corresponding to each input variable, and wherein the input variables are subdivided into seven reference fuzzy sets in fourteen nodes;
Layer 3 is the rules layer with 49 nodes, wherein there are two input vectors and for each input vector seven MFs are needed;
Layer 4 is the fuzzification output layer with 49 nodes, wherein the fourth layer calculates a fitness value of a fuzzy rule; and
Layer 5 is the output layer with 1 node, wherein the output node is a correction amount of aeration quantity.

6. The method according to claim 1, wherein characteristics of the wastewater treatment method are described as follow: the influent COD value is 600~2000 mg/l, the ORP value in the anaerobic tank is −200~0 mv, and the DO value in the aerobic tank is 0.2~4.5 mg/l.

7. The method according to claim 6, wherein the COD fuzzy neural network predictive model and DO fuzzy neural network control model are embedded in a monitoring and control system.

8. The method according to claim 7, wherein the DO fuzzy neural network control model is used to control the dissolved oxygen as follows: when influent loading increase, the air supply is increased, and when the influent loading decreases, the air supply is decreased.

9. The method according to claim 6, wherein the method further comprises the following steps:
based on a TCP/IP and serial data interface (R232/485), real-time control of the method is achieved using the computer and a two-way communication tool;
after achieving the real-time control, a comparative analysis is made using a computer for process efficiency of the wastewater treatment method; and
optionally, the comparative analysis is saved to a computer file.

10. The method according to claim 1, wherein in the method the inflow flowrate, the influent COD value, the ORP value in the anaerobic tank, the DO value in the aerobic tank, and the actual effluent COD value are detected by sensors and signals detected by the sensors are sent to the COD fuzzy neural network predictive model through an analog/digital (A/D) converter module of ADAM4017+ and ADAM4520, so that the effluent COD predicted value is obtained, and the digital signals are changed into analog signals by ADAM4024 to control the speed of a water pump and the air blower.

* * * * *